(12) United States Patent
Inukai et al.

(10) Patent No.: US 7,097,362 B2
(45) Date of Patent: Aug. 29, 2006

(54) ELECTROCORROSION PREVENTIVE ROLLING BEARING

(75) Inventors: Kosuke Inukai, Kuwana (JP); Hideji Ito, Kuwana (JP); Yukihiro Kataoka, Kuwana (JP); Kiyoshi Sato, Takarazuka (JP)

(73) Assignee: NTN Corporation, Osaka (JP)

( * ) Notice: Subject to any disclaimer, the term of this patent is extended or adjusted under 35 U.S.C. 154(b) by 107 days.

(21) Appl. No.: 10/676,075

(22) Filed: Oct. 2, 2003

(65) Prior Publication Data

US 2004/0066997 A1 Apr. 8, 2004

(30) Foreign Application Priority Data

Oct. 8, 2002 (JP) ............................. 2002-294436
Oct. 24, 2002 (JP) ............................. 2002-309200

(51) Int. Cl.
*F16C 19/00* (2006.01)
*F16C 43/00* (2006.01)

(52) U.S. Cl. .................... 384/476; 384/492; 384/510

(58) Field of Classification Search ................ 384/492, 384/476, 510, 513, 537, 559, 560
See application file for complete search history.

(56) References Cited

U.S. PATENT DOCUMENTS

| | | | | |
|---|---|---|---|---|
| 2,370,173 | A | * | 2/1945 | Kendall ...................... 384/513 |
| 5,059,041 | A | * | 10/1991 | Watanabe et al. ........... 384/476 |
| 5,375,933 | A | * | 12/1994 | Mizutani et al. ............ 384/476 |
| 5,961,222 | A | * | 10/1999 | Yabe et al. .................. 384/476 |

2001/0014545 A1  8/2001  Ito et al.

FOREIGN PATENT DOCUMENTS

| | | |
|---|---|---|
| DE | 195 25 702 A1 | 1/1997 |
| DE | 101 61 820 A1 | 9/2002 |
| JP | 2-46119 | 3/1990 |
| JP | 2002206542 A * | 7/2002 |

OTHER PUBLICATIONS

Itoh Hideji et al., Patent Abstracts of Japan, Anti-Electrolytic Corrosion Rolling Bearing, Publication No. 2002-048145 and Publication Date: Feb. 15, 2002.

Nobuyoshi Matsumura, Patent Abstracts of Japan, "Electric Corrosion Inhibitive Type Rolling Bearing", Publication No.: 59103023, Publication Date: Jun. 14, 1984.

* cited by examiner

*Primary Examiner*—Thomas R. Hannon

(57) ABSTRACT

To provide an electrocorrosion preventive rolling bearing assembly wherein a final machining of an electrically insulating layer and a thickness control of the insulating layer can easily and accurately be accomplished, the electrocorrosion preventive rolling bearing assembly is of a type in which an inner race (2) or an outer race (3) is formed with an insulating layer (6) so as to cover a peripheral surface thereof, which engages a housing or a shaft, and opposite annular end faces thereof. The insulating layer (6) is a thermally sprayed layer of a metallic oxide. Of the inner and outer races (2) and (3), a raceway member having the insulating layer (6) is provided at its end face with a tool reference plane (7) for a process of finishing the electrically insulating layer (6) or for the thickness control of the insulating layer. This tool reference plane (7) may be either an indented radial surface of a step (8) formed in the end face or a bare portion of the end face that is left uncovered by the insulating layer (6).

3 Claims, 5 Drawing Sheets

ELECTROCORROSION PREVENTIVE ROLLING BEARING

BACKGROUND OF THE INVENTION

1. Field of the Invention

The present invention generally relates to a rolling bearing assembly adapted to prevent electrocorrosion due to an electric current flowing in rolling bearings utilized in a general purpose motor, an electric power generator or a traction motor of railway.

2. Description of the Conventional Art

Electrocorrosion preventive rolling bearing assemblies have been well known in the art and are disclosed in, for example, the Japanese Laid-open Patent Publication No. 2002-48145 and the Japanese Laid-open Utility Model Publication No. 2-46119. According to these publications, an electrocorrosion preventive rolling bearing assembly has an insulating layer formed by the use of a thermal spraying technique. The electrocorrosion preventive rolling bearing assembly having the insulating layer includes raceway members of which outer peripheral surfaces and annular end faces are covered by a metallic layer and an insulating layer.

In the case of the structure in which the insulating layer is formed, it appears that the difference in thickness of the insulating layer at the annular end faces may increase at the time of finishing work unless the thickness of the insulating layer is controlled and, hence, the insulating property may decrease consequently. When it comes to the thickness control of an insulating layer, thickness control of an insulating layer at the annular end faces of the deep groove ball bearing assembly has to be generally on the basis of raceway grooves and, on the other hand, such thickness control of the insulating layer at the annular end faces of the cylindrical roller bearing assembly has to be generally performed on the basis of rib surfaces of raceway members. Accordingly, not only are complicated work procedures required with a considerable length of time for complete measurements, but also since the end face machining work results in poor precision when performed directly on the basis of the raceway grooves or the ribs, a substantial amount of time and labor is required in accomplishing the work, thereby posing a problem associated with increase of the manufacturing cost.

Also, for mounting the outer race onto a housing by means of a crimping technique, a finishing work of the outer periphery of the outer race is generally carried out on the basis of the inner peripheral surface of the outer race as discussed below where the outer peripheral surface of the outer race that is covered by an electrically insulating layer requires the finishing work. Specifically, with reference to FIG. 9, this finishing work is carried out by fixing a tapered mandrel 36 along the inner peripheral surface of the outer race 32 and, then, while the outer race 32 is rotated together with the tapered mandrel 36, the outer peripheral surface of the outer race 32 is machined, for example, ground to the required dimension.

However, since the inner peripheral surface of the outer race of the bearing assembly is generally of a cylindrical shape, the machining technique shown in and described with reference to FIG. 9 has a problem in that even though the inner periphery of the outer race 32 is fixed at one end thereof to the tapered mandrel 36, a gap is naturally formed at the opposite end of the outer race 32 between the latter and the tapered mandrel 36. Because of this, there is a high possibility that during the machining the outer race 32 may be displaced and/or inclined relative to the tapered mandrel 36. Also, considering that the outer race 32 undergoes a thermal expansion by the effect of heat evolved during the machining, displacement and/or inclination of the outer race 32 relative to the tapered mandrel 36 are apt to occur more often than at normal temperatures. Once the displacement and/or inclination of the outer race 32 occur during the machining, it leads to poor precision (roundness, slant of the outer peripheral surface, radial deflection and so on) of the outer peripheral surface of the outer race 32. In order to alleviate these problems, the machining is typically performed while the outer race 32 is restrained, requiring further complicated work procedures.

SUMMARY OF THE INVENTION

In view of the foregoing, the present invention is intended to provide an electrocorrosion preventive rolling bearing assembly wherein the final machining of the electrically insulating layer discussed above and the thickness control of the insulating layer can easily and accurately be accomplished.

In order to accomplish the foregoing object, the present invention provides an electrocorrosion preventive rolling bearing assembly which includes an inner race or an inner raceway member, an outer race or an outer raceway member, and at least one circumferential row of a plurality of rolling elements rollingly interposed between the inner and outer races. An electrically insulating layer is formed on at least one of the inner and outer raceway members so as to cover a peripheral surface and opposite annular end faces of such at least one of the inner and outer raceway members. The peripheral surface of such at least one of the inner and outer raceway members is for engagement with either a housing or a shaft. A tool reference plane utilizable for a process of finishing the electrically insulating layer or for a thickness control of the insulating layer is defined in at least one of opposite sides of raceway grooves of such at least one of the inner and outer races.

According to the present invention, because of the tool reference plane being defined on one or both of the opposite sides of the raceway groove of the raceway member, the tool reference plane can be utilized directly when the electric insulating layer is finished to a predetermined size by means of a machining technique or when the thickness control of the insulating layer is performed after the machining. Accordingly, any otherwise complicated work such as required when a raceway groove or a rib surface of an inner or outer race is utilized as a tool reference plane can be advantageously eliminated, allowing the thickness control of the insulating layer after the machining to be performed easily and accurately.

More specifically, the tool reference plane may be defined by an indented radial surface area of a step defined in the end face of the raceway member. Where the tool reference plane is defined by the step, the tool reference plane can be secured with high precision by means of a highly precise machining of forming the step.

The tool reference plane may be alternatively defined by a bare surface area in the end face of the raceway member, which area is left uncovered by the insulating layer. Since the tool reference plane can be defined merely by leaving a portion of the end face uncovered with the electrically insulating layer, the tool reference plane can be formed easily.

The tool reference plane may be formed by means of a hardened steel cutting process or a grinding process. With these processes, a highly precise machining can be achieved, resulting in the tool reference with a high precision.

Also, the tool reference plane may be provided on respective sides of a raceway groove formed on the inner peripheral surface of an outer raceway member so as to engage an outer peripheral surface of a tapered mandrel along the entire axial length of the plane.

Considering that the tapered mandrel is inserted into an inner peripheral surface when the outer diameter of the outer race is subjected to a final machining, the tool reference plane defined on those sides of the raceway groove is effective to allow the outer race to be held in stable contact with the mandrel since the tool reference plane is firmly engageable with the mandrel along the entire axial length of the plane. For this reason, an undesirable inclination and/or distortion of the outer race relative to the tapered mandrel during the outer diameter finishing process will hardly occur, keeping the outer race held firmly in position during such process. As such, no complicated procedure such as required hitherto in the art is required and the process of finishing the outer diameter of the outer race can be performed easily and accurately.

The tool reference plane may represent a tapered surface or a curved surface such as a substantially arcuate surface in an axial sectional view, or may be represented by an inner peripheral surface of an annular projection formed on the inner peripheral surface of the outer race.

Where the tool reference plane is in the form of a tapered surface, the use of the tapered mandrel having the same gradient as that of the tapered surface of the outer race is effective to allow the tapered surface of the mandrel to be held in surface contact with the tapered surface of the inner periphery of the outer race at the time of the final machining of the outer periphery of the outer race. The surface contact so achieved is effective to make it more difficult for the inclination and/or distortion of the outer race to occur during the outer diameter machining, allowing the posture to be stabilized.

Where the inner peripheral surface of the outer race is represented by the tapered surface as described above, the tapered surface preferably has a gradient of $\frac{1}{100}$ to $\frac{1}{3000}$. Although the gradient of the tapered surface is preferred to be large so that the outer race can be firmly positioned on the tapered mandrel, the presence of a too large gradient in the inner peripheral surface of the outer race is undesirable in view of designing dimensions of various parts of the bearing assembly. The gradient of the tapered surface within the range of $\frac{1}{100}$ to $\frac{1}{3000}$ has been found desirable because the outer race can be firmly fixed to the tapered mandrel and because it does not pose any problem in designing the dimensions of various parts of the bearing assembly.

Where the tool reference plane engageable with the outer peripheral surface of the tapered mandrel is provided, the electrically insulating layer may be a layer made of a ceramic material or a layer of a synthetic resin, for example, a polyphenylene sulfide resin. In the case of the ceramic material used for the electrically insulating layer, the electrically insulating layer having an excellent electric insulation and an excellent dimensional stability to change in temperature can be obtained advantageously. On the other hand, in the case of the polyphenylene sulfide resin employed for the electrically insulating layer, since of various resins the polyphenylene sulfide resin is excellent in ease to molding, the electrically insulating layer excellent in dimensional stability and electric insulation can be easily formed.

Also, the electrocorrosion preventive rolling bearing assembly may be either a deep groove ball bearing or a cylindrical roller bearing of which outer race has a rib. Those types of the bearing assemblies pose no problem even if a portion of the inner peripheral surface of the outer race except for the raceway groove is formed as a tapered surface, or the end surface of the outer race is rendered to have a large surface area, and will, accordingly, provide a rolling bearing assembly having an excellent insulating property with the outer peripheral surface and the annular end faces of the outer race sufficiently covered by the electrically insulating layer.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
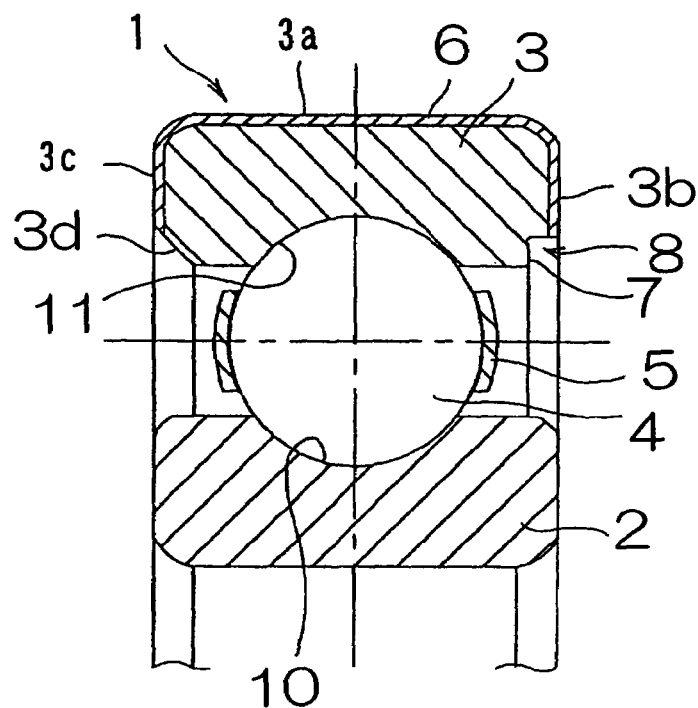
FIG. 1 is a fragmentary longitudinal sectional view of an electrocorrosion preventive rolling bearing assembly according to a first preferred embodiment of the present invention.
Figure 2:
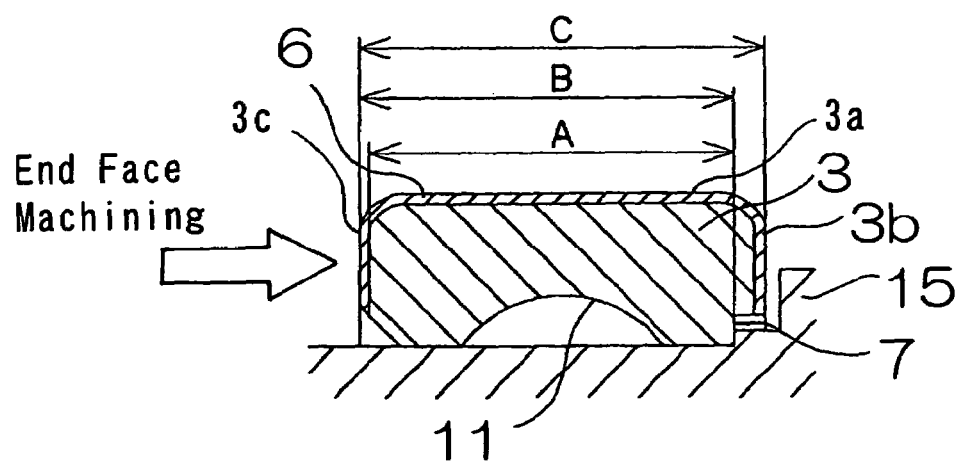
FIG. 2 is an explanatory diagram showing an example of a method of machining opposite annular end faces of an outer race of the rolling bearing assembly.

A first preferred embodiment of the present invention will now be described with particular reference to FIGS. 1 and 2. An electrocorrosion preventive rolling bearing assembly 1 shown therein includes an inner race 2 defining an inner raceway member and an outer race 3 defining an outer raceway member, with at least one circumferential row of a plurality of rolling elements 4 rollingly interposed between the inner and outer races 2 and 3. This electrocorrosion preventive rolling bearing assembly 1 also includes an insulating layer 6 formed so as to cover an outer peripheral surface 3a of the outer race 3, which is engaged with a housing (not shown), and opposite annular end faces 3b and 3c lying generally perpendicular to the outer peripheral surface 3a. One of the opposite annular end faces of the outer race 3, for example, the end face 3b is provided with an annular tool reference plane 7 defined therein. It should be understood that while herein referred to as a tool reference plane, such as is depicted in the two-dimensional figures, the tool reference plane represents a surface of a three-dimensional object. The electrocorrosion preventive rolling bearing assembly 1 is a deep groove ball bearing and, hence, the rolling elements 4 are each represented by a ball. The inner and outer races 2 and 3 have respective raceway grooves 10 and 11 defined in outer and inner peripheral surfaces thereof, respectively, and the circumferential rows of the rolling elements 4 are received in part within the raceway groove 10 and in part within the raceway groove 11. The rolling elements 4 are retained within respective pockets defined in a retainer or cage 5 at respective locations circumferentially thereof.

The insulating layer formed on the outer race 3 may be of either a single layer structure or a multilayer structure. The annular tool reference plane 7 is a surface used for the end face machining or for the thickness control of the insulating layer on the end face and is formed in an inner peripheral edge of the end face 3b of the outer race 3 adjacent the raceway groove 11. In other words, This tool reference plane 7 is defined by an indented radial surface of an annular step 8 formed in an inner peripheral edge of the end face 3b of the outer race 3. The annular step 8 has an outer diameter and a depth that generally correspond to the size left by removal of that portion of an inner peripheral surface of the outer race 3 where an chamfered surface 3d is formed. The annular step 8 may be formed by machining either prior to or after a thermal spraying employed to form the insulating layer 6 on the outer race 3. This machining may be, for example, a grinding process or a hardened steel cutting process. The inner and outer races 2 and 3 and the rolling elements 4 are all made of steel such as a bearing steel.

The insulating layer 6 formed on a material surface of the outer race 3 by the use of a thermal spraying technique is prepared from a metallic oxide such as aluminum oxide ($Al_2O_3$), titanium oxide ($TiO_2$) or chromium oxide ($Cr_2O_3$), or compound metallic oxide containing one or more of such metallic oxides. This insulating layer 6 is, after the thermal spraying, subjected to a machining process as will subsequently be described. The difference in thickness of the insulating layer 6 between the left and right annular end faces 3b and 3c is preferably to be suppressed to a value not greater than 50 µm. Also, the parallelism the tool reference plane 7 and the end face 3b prior to the thermal spraying is preferably not greater than 25 µm.

According to the foregoing embodiment shown in and described with reference to FIGS. 1 and 2, the use of the tool reference plane 7 defined in the end face 3b of the outer race 3 is advantageous in that the tool reference plane 7 can be utilized directly when the annular end faces 3b and 3c are being finished by means of the machining to a predetermined dimension or during the thickness control of the insulating layer on the annular end faces 3b and 3c after the machining. Accordingly, any otherwise complicated work such as required when the race groove 11 of the outer race 3 would be utilized as a tool reference plane can be advantageously eliminated, allowing the thickness control of the insulating layer 6 after the machining to be performed easily and accurately. Since the tool reference plane 7 can be defined in the form of the step 8, the plane 7 can be formed with high precision by a machining work. Also, if the tool reference plane 7 is formed by means of a grinding process or a hardened steel cutting process, it is possible to form it more precisely.

An example of the end face machining employed in the illustrated embodiment will now be described with reference to FIG. 2. This end face machining is carried through the following sequential steps (1) to (4):

(1) With respect to all products, the first width (the axial length) A between the annular tool reference plane 7 in the outer race 3 and the end face 3c of the outer race 3 remote from the tool reference plane 7 is measured prior to the thermal spraying.

(2) After the thermal spraying having been effected, the second width B between the annular tool reference plane 7 and the annular outer surface of the insulating layer 6 on the end face 3c is measured to determine a depth of cut or an axial dimension to cut in by machining for the end face of the insulating layer 6 on the end face 3c remote from the tool reference plane 7. With the tool reference plane 7 applied to a backing plate 15, the end face of the insulating layer 6 remote from the tool reference plane 7 is machined by means of, for example, a grinding technique.

(3) With reference to a target dimension desired to be achieved and the total width C as measured between the opposite annular end faces 3b and 3c which are covered by the insulating layer 6, another depth of cut is determined.

(4) With the machined end face 3c taken as a reference, the opposite end face 3b adjacent the tool reference plane 7 is machined so as to allow it to fall within the allowance of the final width.

According to the theoretical calculation, variation in insulating performance in each product can be minimized when the difference in thickness of the respective end surfaces of the insulating layer 6 covering the annular end faces 3b and 3c is suppressed to 50 µm by means of the method discussed above. For example, with the method discussed above, the difference in dielectric withstanding voltage between the respective end surfaces of the insulating layer 6 can be suppressed to a value equal to or lower than 0.5 kV. Also, the depth of cut can easily be controlled and reduction in number of machining steps can be appreciated.

Figure 3:
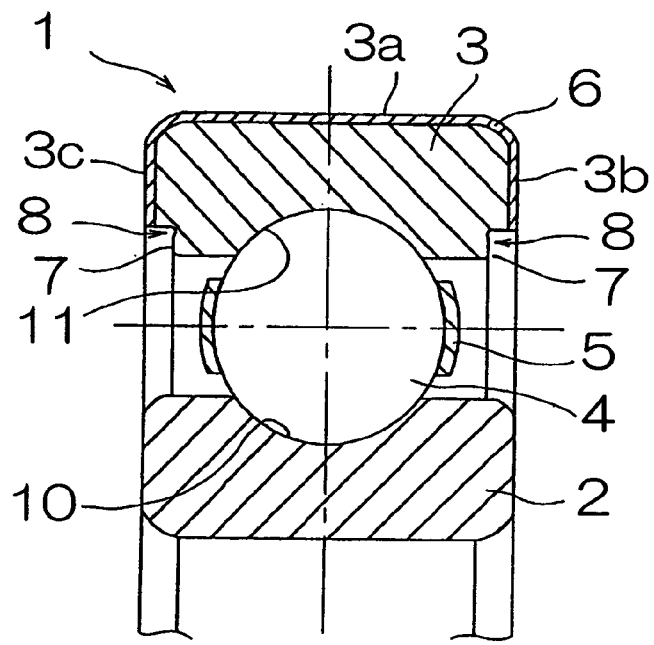
FIG. 3 is a fragmentary longitudinal sectional view of an electrocorrosion preventive rolling bearing assembly according to a second preferred embodiment of the present invention.

According to the foregoing embodiment, the annular tool reference plane 7 has been shown and described as defined in only one of the opposite annular end faces of the outer race 3. However, according to a second embodiment, the annular tool reference plane 7 may be defined in each of the opposite annular end faces 3b and 3c of the outer race 3 as shown in FIG. 3. Even in this second embodiment shown in FIG. 3, the annular tool reference plane 7 in each of the opposite annular end faces 3b and 3c of the outer race 3 is defined by an indented radial surface, i.e., a bottom surface of the step 8 formed in the outer race 3.

Figure 4:
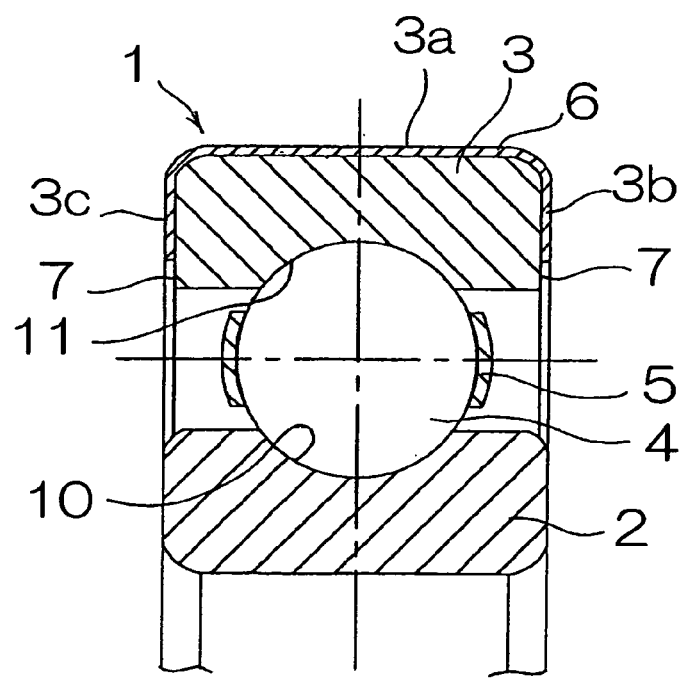
FIG. 4 is a fragmentary longitudinal sectional view of an electrocorrosion preventive rolling bearing assembly according to a third preferred embodiment of the present invention.

Also, in a third preferred embodiment of the present invention shown in FIG. 4, the annular tool reference plane 7 may be defined in the form of an annular bare surface area in each of the annular end faces 3b and 3c of the outer race 3, which are left uncovered by the insulating layer 6. In other words, respective surface areas of the annular end faces 3b and 3c of the outer race 3 are not thermally sprayed so that those surface areas left uncovered by the insulating layer 6 can be utilized as the tool reference planes 7.

It is to be noted that where a similar insulating layer 6 is to be formed on the inner race 2 in a manner similar to that on the outer race 3, the annular tool reference plane has to be formed in a manner described in connection with any one of the foregoing embodiments. It is also to be noted that while in any one of the foregoing embodiments reference has been made to the deep groove ball bearing assembly, the present invention can be equally applied to a cylindrical roller bearing assembly or any other rolling bearing assembly in which the insulating layer 6 is desired or required to be formed.

Figure 5:
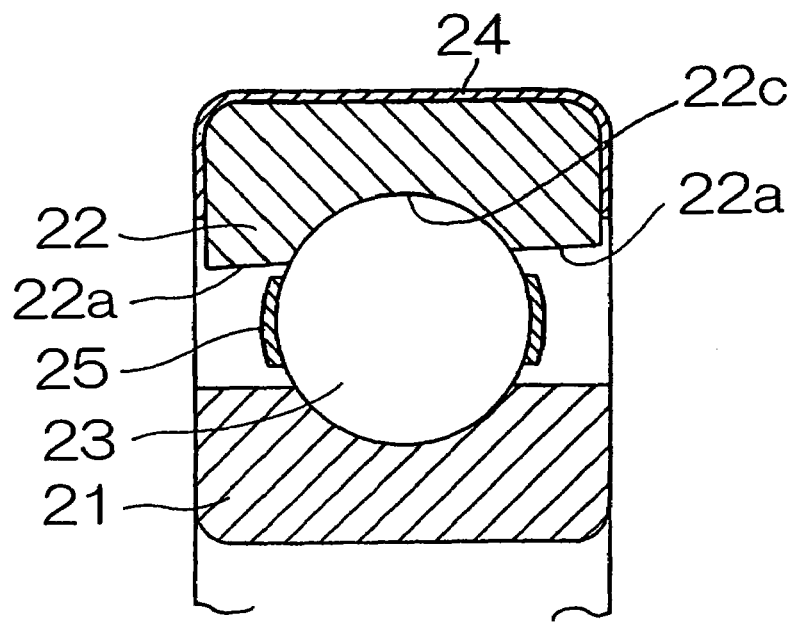
FIG. 5 is a fragmentary longitudinal sectional view of an electrocorrosion preventive rolling bearing assembly according to a fourth preferred embodiment of the present invention.
Figure 6:
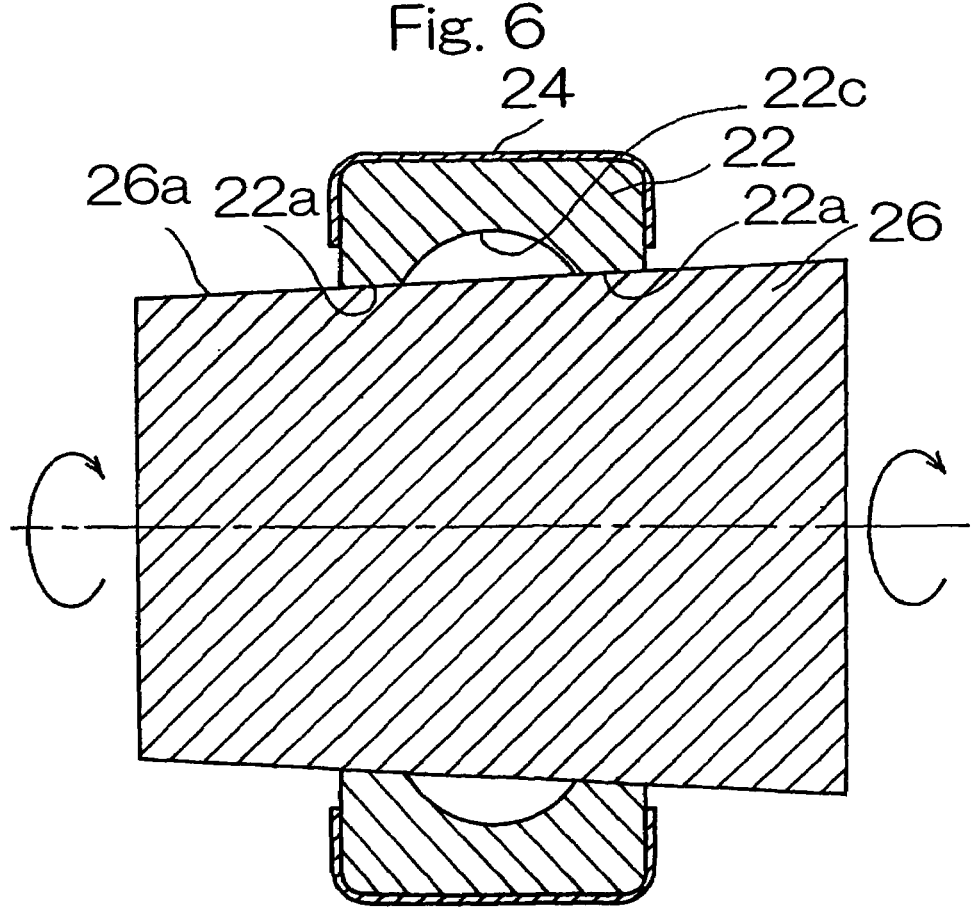
FIG. 6 is a longitudinal sectional view of the rolling bearing assembly of FIG. 5, showing an example of a method of machining an outer periphery of the outer race of the rolling bearing assembly.

With reference to FIGS. 5 and 6, a fourth preferred embodiment of the present invention will now be described. The electrocorrosion preventive rolling bearing assembly includes, as best shown in FIG. 5, an inner race 21 defining an inner raceway member and an outer race 22 defining an outer raceway member, with at least one circumferential row of a plurality of rolling elements 23 rollingly interposed between the inner and outer races 21 and 22. This electrocorrosion preventive rolling bearing assembly also includes an insulating layer 24 formed so as to cover an outer peripheral surface and opposite annular end faces of the outer race 22 lying generally perpendicular to the outer peripheral surface. The inner and outer races 21 and 22 have respective raceway grooves (only the raceway groove in the outer race 22 being indicated by 22c) defined in outer and inner peripheral surfaces thereof, respectively, and the circumferential rows of the rolling elements 23 are received in part within the raceway groove 22c in the outer race 22 and in part within the raceway groove in the inner race 21.

A portion of the inner peripheral surface of the outer race 22 excluding a surface area thereof where the raceway groove 22c (i.e., inner peripheral surface areas on respective sides of the raceway groove 22c) is defined as a cylindrical tool reference plane 22a which is so shaped as to conform to the contour of the outer peripheral surface 26a of the tapered mandrel 26. Hence, that portion of the inner peripheral surface of the outer race 22 excluding the raceway groove 22c is similarly tapered and defines the tool reference plane 22a.

The electrocorrosion preventive rolling bearing assembly may be utilized for rotatably supporting a rotor of a primary electric motor of, for example, a railway vehicle. This electrocorrosion preventive rolling bearing assembly is a deep groove ball bearing and the rolling elements 23 are each represented by a ball and are rollingly retained by a retainer or cage 25. The inner and outer races 21 and 22, the rolling elements 23 and the retainer 25 are all made of a metallic material such as a bearing steel or the like.

The electrically insulating layer 24 is made of, for example, a ceramic material and is formed by thermally spraying the ceramic material so as to cover the outer peripheral surface and annular end faces of the outer race 22. The ceramic material may be a metallic oxide such as alumina ($Al_2O_3$), titanium oxide ($TiO_2$) or chromium oxide ($Cr_2O_3$), or a compound metallic oxide containing at least one of those metallic oxides as a base material. For the electric insulating layer 24, a resinous material may also be employed. Where the resinous material is employed, a polyphenylene sulfide (PPS resin) resin is preferred. Also, the electrically insulating layer 24 may be of either a single layer structure or a multi-layered structure.

The cylindrical tool reference plane 22a so defined in the outer race 22 is tapered at a gradient of $1/100$ to $1/3000$. This gradient of the cylindrical tool reference plane 22a is so selected as to match the gradient of the tapered outer peripheral surface 26a of the tapered mandrel 26 that is inserted into the inner peripheral surface of the outer race 22 in a manner as shown in FIG. 6, at the time of performing a final machining of the outer peripheral surface of the outer race 22.

In the electrocorrosion preventive rolling bearing assembly of the structure according to the fourth embodiment discussed above, because of the electrically insulating layer 24 interposed between the outer race 22 and a housing to which the rolling bearing assembly is mounted, an insulating property can be secured not only therebetween but also between a shaft, which may be engaged in the inner race 21, and the housing. For this reason, it is possible to prevent raceway surfaces from being roughened which would otherwise result from sparks taking place between the respective raceway grooves of the inner and outer races 21 and 22 and the rolling elements 23.

On manufacture of the rolling bearing assembly of the structure described above, the tapered mandrel 26 is inserted into the opening of the outer race 22 in a manner as shown in FIG. 6 and, then, the outer diameter of the outer race 22 is tailored to a predetermined or required value by means of, for example, a grinding technique while the tapered mandrel 26 is fixed to the outer race 22 and is rotated together therewith. Since at this time, the tool reference plane 22a in the inner peripheral surface of the outer race 22 is held in a surface contact with the outer peripheral surface 26a of the tapered mandrel 26 and the tapered mandrel 26 is hence stably fixed to the inner peripheral surface of the outer race 22, an undesirable inclination and/or distortion of the outer race 22 relative to the tapered mandrel 26 during the outer diameter finishing process will hardly occur. As such, no complicated procedure such as required hitherto in the art is required and the process of finishing the outer diameter of the outer race 22 can be performed easily and accurately.

Figure 7:
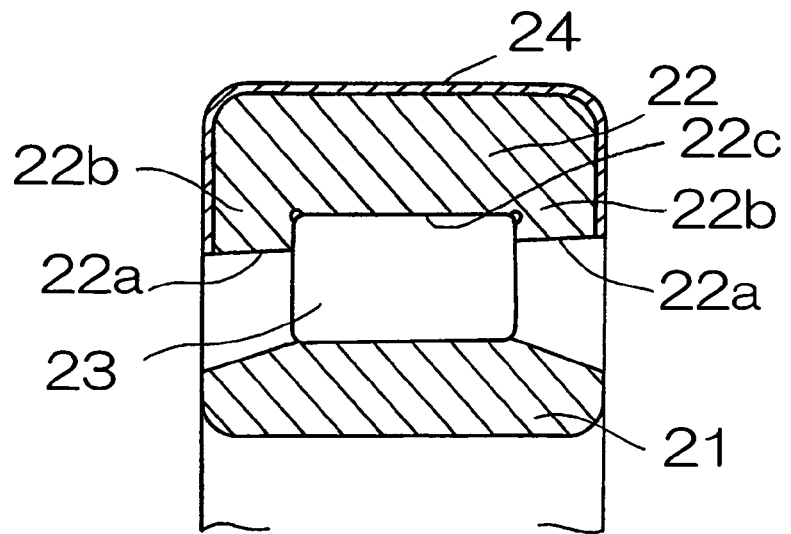
FIG. 7 is a fragmentary longitudinal sectional view of an electrocorrosion preventive rolling bearing assembly according to a fifth preferred embodiment of the present invention.

A fifth preferred embodiment of the present invention is shown in FIG. 7. Referring to FIG. 7, the electrocorrosion preventive rolling bearing assembly shown therein is a cylindrical roller bearing assembly of which outer race 22 has a rib 22b defined in each of opposite ends thereof. The rolling elements 23 employed therein may be rollingly retained within respective pockets in the retainer, or the retainer or cage may be dispensed with to provide a full complement ball or roller bearing. Other structural features of the bearing assembly shown in FIG. 7 are similar to those in connection with the fourth embodiment shown and described with reference to FIGS. 5 and 6 and, therefore, the details thereof are not reiterated for the sake of brevity.

Figure 8:
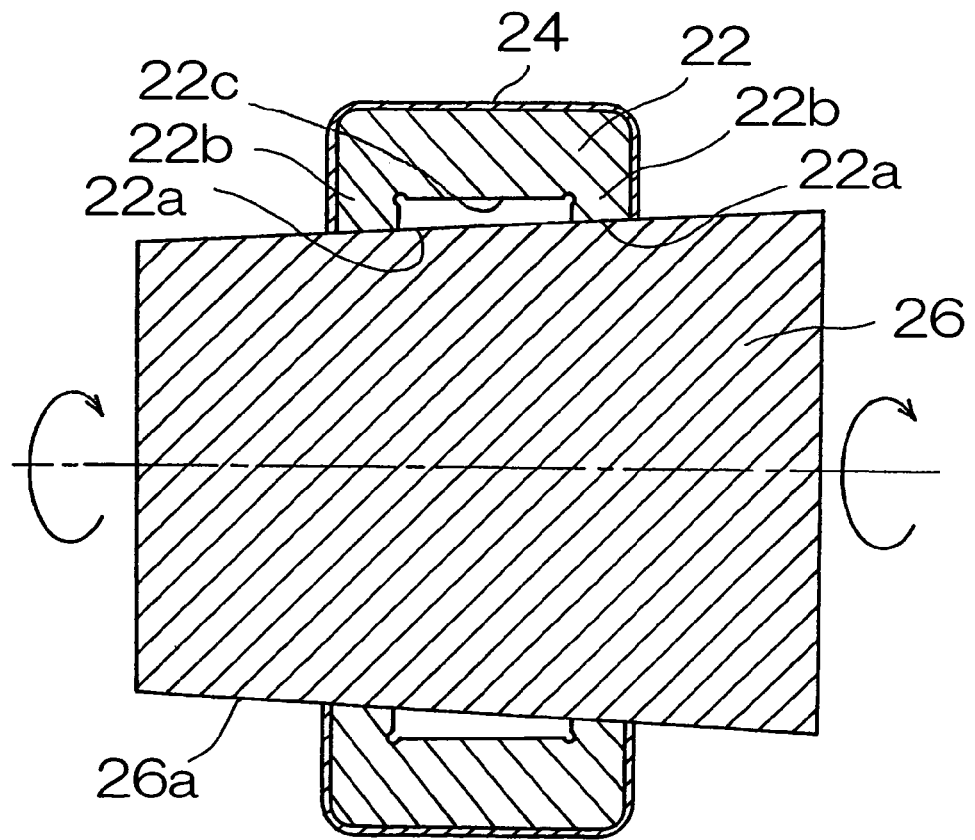
FIG. 8 is a longitudinal sectional view of the rolling bearing assembly of FIG. 7, showing an example of a method of machining an outer periphery of the outer race of the rolling bearing assembly.
Figure 9:
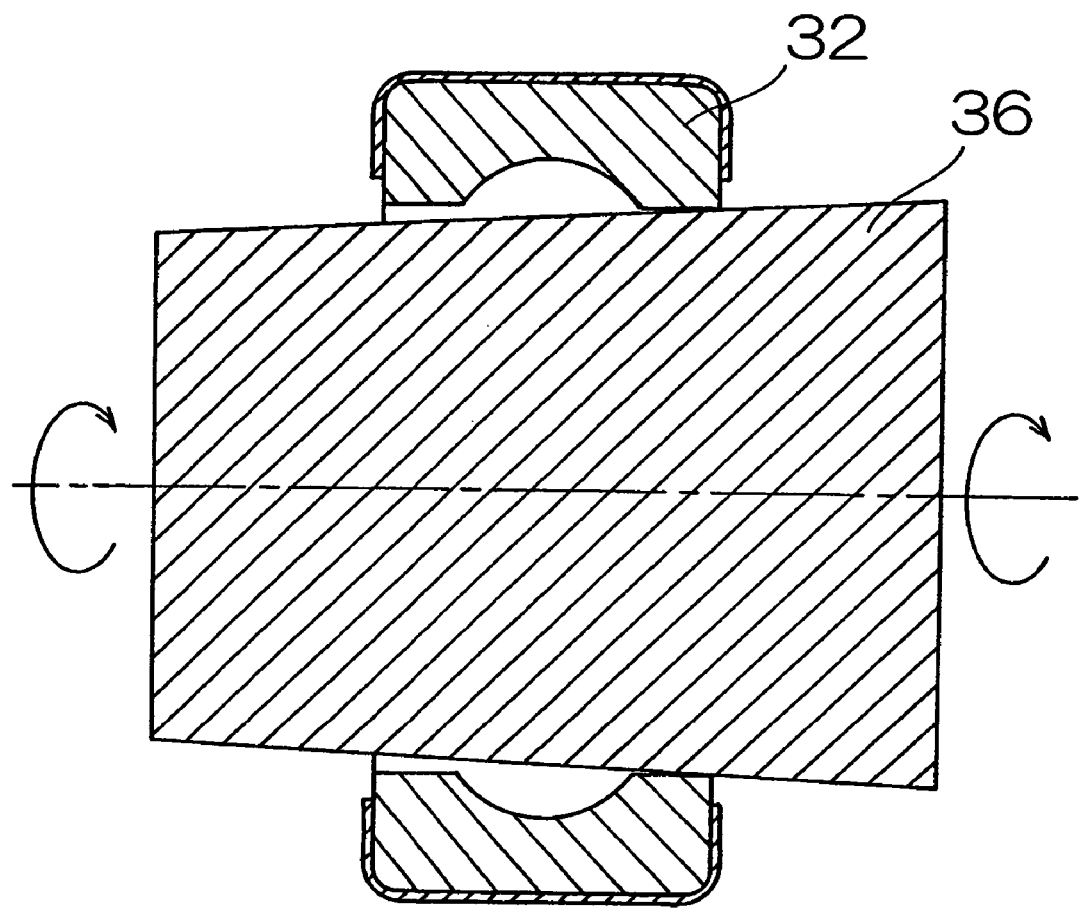
FIG. 9 is an explanatory diagram showing a conventional method of machining an outer periphery of an outer race of a rolling bearing.

Even in the embodiment shown in and described with reference to FIG. 7, when the tapered mandrel 26 is inserted into the opening of the outer race 22 in a manner as shown in FIG. 8 and, then, the outer diameter of the outer race 22 is tailored to a predetermined or required value while the tapered mandrel 26 is rotated together with the outer race 22, the tapered mandrel 26 can be stably fixed to the inner peripheral surface of the outer race 22. Because of this, the process of finishing the outer diameter of the outer race 22 can be performed easily and accurately.

It is to be noted that while in the foregoing embodiment the tool reference plane 22a in the outer race 22 has been shown and described as tapered, the tool reference plane 22a may have an axial sectional shape representing a curved surface, e.g., a substantially arcuate surface, or a stepped surface, or may be represented by an inner peripheral surface of an annular projection (not shown) formed in the inner peripheral surface of the outer race 22.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An electrocorrosion preventive rolling bearing assembly, comprising:
    an inner raceway member;
    an outer raceway member;
    at least one circumferential row of a plurality of rolling elements rollingly interposed between respective raceway grooves of the inner and outer raceway members;
    an electrically insulating layer formed on the outer raceway member to cover an outer peripheral surface and opposite annular end faces of the outer raceway member;
    wherein, positioned between one of the opposite annular end faces and an inner peripheral surface of the outer raceway member and uncovered by the insulating layer, a first step is recessed from the first annular end face such that a peripheral surface of the first step is located a first radial distance from the inner peripheral surface, and
    on the remaining opposite annular end face, there is defined either
        a second step, recessed from the remaining annular end face such that a peripheral surface of the second step is located the first radial distance from the inner peripheral surface, uncovered by the insulating layer, and positioned between the remaining opposite annular end face and the inner peripheral surface, or
        a chamfered portion uncovered by the insulating layer and positioned between the remaining opposite annular end face and the inner peripheral surface, such that an intersection between the chamfered portion and the remaining annular end face is located the first radial distance from the inner peripheral surface.

2. An electrocorrosion preventive rolling bearing assembly, comprising:
    an inner raceway member;
    an outer raceway member;
    at least one circumferential row of a plurality of rolling elements rollingly interposed between respective raceway grooves of the inner and outer raceway members;
    an electrically insulating layer formed on at least one of the inner or outer raceway members so as to cover a peripheral surface and opposite annular end faces of such at least one of the inner and outer raceway members, the peripheral surface of such at least one of the inner and outer raceway members being engageable with either a housing or a shaft; and
    a tool reference plane defined in at least one of opposite sides of the raceway groove of the raceway member, the tool reference plane being utilizable for a process of finishing the electrically insulating layer or for a thickness control of the insulating layer, wherein
    on a first one of the opposite annular end faces, the tool reference plane is defined by a first step recessed from the first annular end face of the raceway member such that a peripheral surface of the first step is located a first radial distance from an inner peripheral surface of the outer raceway member or an outer peripheral surface of the inner raceway, the first step being uncovered by the insulating layer and positioned between the first annular end face and the inner peripheral surface of the outer raceway member or the outer peripheral surface of the inner raceway member, and
    on the remaining opposite annular end face, there is defined either
        a second step recessed from the remaining annular end face of the raceway member, such that a peripheral surface of the second step is located the first radial distance from the inner peripheral surface of the outer raceway member or the outer peripheral surface of the inner raceway, the second step being uncovered by the insulating layer and positioned on a peripheral edge corresponding to a position of the tool reference plane on the first annular end face, or
        a chamfered portion uncovered by the insulating layer and positioned on a peripheral edge corresponding to a position of the tool reference plane on the first annular end face, such that an intersection between the chamfered portion and the remaining annular end face is located the first radial distance from the inner peripheral surface of the outer raceway member or the outer peripheral surface of the inner raceway.

3. The electrocorrosion preventive rolling bearing assembly as claimed in claim 2, wherein the tool reference plane is a surface area formed by means of a hardened steel cutting process or a grinding process.

* * * * *